United States Patent
Zhang et al.

(10) Patent No.: US 11,722,910 B2
(45) Date of Patent: *Aug. 8, 2023

(54) ON-DEMAND COVERAGE EXTENDED BROADCAST SIGNAL

(71) Applicant: QUALCOMM Incorporated, San Diego, CA (US)

(72) Inventors: Xiaoxia Zhang, San Diego, CA (US); Zhifei Fan, San Diego, CA (US); Jing Sun, San Diego, CA (US); Andrei Dragos Radulescu, La Jolla, CA (US); Srinivas Yerramalli, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/302,263

(22) Filed: Apr. 28, 2021

(65) Prior Publication Data

US 2021/0250779 A1 Aug. 12, 2021

Related U.S. Application Data

(63) Continuation of application No. 16/372,917, filed on Apr. 2, 2019, now Pat. No. 11,019,504.
(Continued)

(51) Int. Cl.
*H04W 16/26* (2009.01)
*H04W 74/08* (2009.01)

(52) U.S. Cl.
CPC ........ *H04W 16/26* (2013.01); *H04W 74/0833* (2013.01)

(58) Field of Classification Search
CPC . H04W 16/26; H04W 74/0833; H04W 48/12; H04W 4/70; H04L 1/08
See application file for complete search history.

(56) References Cited

U.S. PATENT DOCUMENTS 9,515,772 B2 12/2016 Shieh
10,798,531 B2 * 10/2020 Fujishiro ................. H04W 4/70
(Continued)

FOREIGN PATENT DOCUMENTS

EP 2787672 A1 10/2014
WO 2015116870 A1 8/2015

OTHER PUBLICATIONS

Intel Corporation: "Discussion on PRACH Coverage Enhancement for Low Cost MTC", R1-132930, 3GPP TSG RAN WG1 Meeting #74, 3rd Generation Partnership Project (3GPP), Mobile Competencecentre ; 650, Route Des Lucioles ; F-06921 Sophia-Antipolis, XP050716170, Barcelona, Spain, Aug. 19-23, 2013, Aug. 10, 2013 (Aug. 10, 2013), pp. 1-7, URL:http://www.3gpp.org/ftp/tsg_ran/WG1_RL1/TSGR1_74/Docs/R1-132930.zip, section 3; p. 3-p. 5; figure 1; table 5.

(Continued)

*Primary Examiner* — Donald L Mills
(74) *Attorney, Agent, or Firm* — Haynes and Boone, LLP

(57) ABSTRACT

Wireless communications systems and methods related to on-demand cell coverage extension for broadcast signals are provided. A first wireless communication device communicates, with a second wireless communication device, a first extended cell coverage request. The first wireless communication device communicates, with the second wireless communication device, a first broadcast communication signal in an extended cell coverage mode in response to the first extended cell coverage request. The first broadcast communication signal includes a system information block (Continued)

repeated in at least one of a time domain or a frequency domain.

20 Claims, 9 Drawing Sheets

Related U.S. Application Data

(60) Provisional application No. 62/652,576, filed on Apr. 4, 2018.

(56) References Cited

U.S. PATENT DOCUMENTS

| | | |
|---|---|---|
| 2014/0098761 A1 | 4/2014 | Lee et al. |
| 2015/0124741 A1 | 5/2015 | Shieh |
| 2015/0296518 A1 | 10/2015 | Yi et al. |
| 2016/0353440 A1 | 12/2016 | Lee et al. |
| 2018/0070282 A1 | 3/2018 | Su et al. |
| 2018/0167946 A1 | 6/2018 | Si et al. |
| 2018/0279239 A1* | 9/2018 | Si .......................... H04W 76/28 |
| 2019/0029049 A1* | 1/2019 | Akkarakaran ...... H04W 72/046 |
| 2019/0150218 A1 | 5/2019 | Futaki |
| 2019/0261421 A1 | 8/2019 | Peisa et al. |
| 2019/0313260 A1 | 10/2019 | Zhang et al. |
| 2019/0313371 A1 | 10/2019 | Papasakellariou et al. |
| 2019/0313445 A1 | 10/2019 | Tsai |
| 2019/0335470 A1* | 10/2019 | Si .......................... H04L 1/0061 |
| 2019/0387550 A1 | 12/2019 | Pan et al. |
| 2020/0045618 A1 | 2/2020 | Chang et al. |
| 2020/0107247 A1* | 4/2020 | Ioffe ................. H04W 74/0833 |
| 2020/0322992 A1 | 10/2020 | Isogawa et al. |

OTHER PUBLICATIONS

International Preliminary Report on Patentability—PCT/US2019/025516, The International Bureau of WIPO—Geneva, Switzerland, dated Oct. 15, 2020.

International Search Report and Written Opinion—PCT/US2019/025516—ISA/EPO—dated Jun. 11, 2019.

* cited by examiner

ON-DEMAND COVERAGE EXTENDED BROADCAST SIGNAL

CROSS REFERENCE TO RELATED APPLICATIONS

The present application is a continuation application of U.S. Non-Provisional patent application Ser. No. 16/372,917, filed Apr. 2, 2019, which claims priority to and the benefit of the U.S. Provisional Patent Application No. 62/652,576, filed Apr. 4, 2018, the disclosure of each of which is hereby incorporated by reference in its entirety as if fully set forth below and for all applicable purposes.

TECHNICAL FIELD

This application relates to wireless communication systems, and more particularly to providing broadcast information in an extended cell coverage mode based on requests.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum. NR can further apply coverage extension (CE) techniques to extend network coverage without deploying additional cells. The CE techniques can be employed for communications over a licensed frequency band, an unlicensed frequency band, and/or a shared frequency band.

In a wireless communication network, a BS may transmit broadcast signals including synchronization signals and/or network system information. A UE may listen to the broadcast signals, synchronize to the BS based on the synchronization signals, and initiates a communication with the BS based on the network system information. The BS may transmit the broadcast signals using a certain transmission scheme to provide communications in a normal coverage area. In order to extend the coverage or the reach of the broadcast signals, the BS may transmit the broadcast signals using a more robust transmission scheme so that UEs located outside of the normal coverage area may receive the broadcast signals and communicate with the BS. For example, the BS may apply signal repetitions to increase the coverage or reach. Thus, the system overhead for coverage extended broadcast transmissions can be substantial, especially when the BS operates in a mmWave band where each broadcast transmission may be repeated in multiple beam directions. However, the coverage extended broadcast may be required by UEs located outside of the normal coverage area, and not by UEs located within the normal coverage area. Thus, when there is no UE located outside of the normal coverage area, the coverage extended broadcast can be inefficient in utilizing system resources.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first extended cell coverage request; and communicating, by the first wireless communication device with the second wireless communication device, a first broadcast communication signal in an extended cell coverage mode in response to the first extended cell coverage request.

In an additional aspect of the disclosure, an apparatus includes a transceiver configured to communicate, with a wireless communication device, a first extended cell coverage request; and communicate, with the wireless communication device, a first broadcast communication signal in an extended cell coverage mode in response to the first extended cell coverage request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
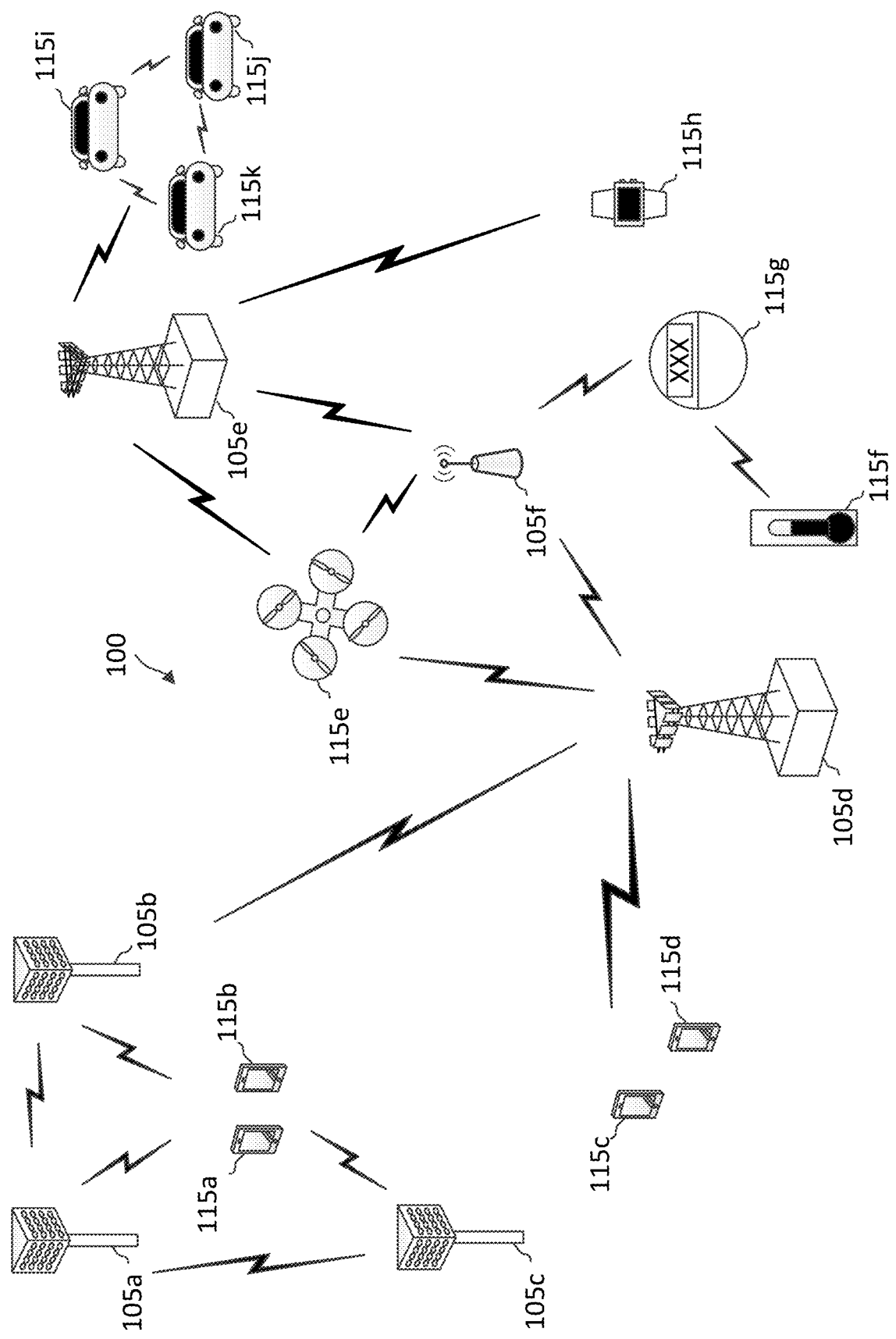
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for broadcasting information in an extended cell coverage mode based on requests. For example, a BS may transmit broadcast signal in a network to facilitate communications in the network. The broadcast signals may include synchronization signal blocks (SSBs) and system information blocks (SIBs). The BS may transmit the broadcast signals using a certain transmission scheme to provide communication coverage in a certain area under a normal coverage operational mode. The BS may extend the coverage or reach of the broadcast signals based on demands or requests. For example, a UE located near the edge of the normal coverage area or outside of the normal coverage area may request the BS to transmit the broadcast signal in a coverage extension (CE) mode. Upon receiving the request, the BS may transmit the broadcast signals in the CE mode, for example, by repeating broadcast information in a time domain and/or in a frequency domain. The BS may switch to transmit the broadcast signals without the deep coverage (e.g., in a normal or non-CE mode) when the extended coverage is no longer needed. The dynamic switching between the CE mode and the non-CE mode based on CE requests and/or CE support requirements can reduce system overhead, and thus may improve system resource utilization efficiency.

In an embodiment, the BS may begin with transmitting SSBs in a CE mode and transmitting SIBs in a non-CE mode without the deep coverage. The BS may switch to transmit SIBs in the CE mode upon a request from a UE. The request can be in the form of a random access preamble signal. The SSBs can include a CE request configuration for transmitting a request for SIBS in the CE mode. The configuration can include resources (e.g., time-frequency resources) and preamble formats for transmitting the request. The configuration can include an SIB detection expiration period. For example, the UE may receive the SSBs in the CE mode. When the UE fails to detect an SIB in the expiration period, the UE may transmit the request based on the configuration.

In an embodiment, the BS may begin with transmitting SSBs and SIBs in a non-CE mode. The BS may switch to transmit SSBs and SIBs in the CE mode upon a request from a UE. A UE failing to detect the SSBs and SIBs in the non-CE mode may request for SSBs and SIBs in the CE mode. The UE may be pre-configured with predetermined waveforms, frequency locations, and/or time windows for transmitting the request.

In an embodiment, the BS may begin with transmitting SSBs and SIBs in a non-CE mode and reduced SSBs or light SSBs in a CE mode. The light SSBs may include a reduced set of information compared to the SSBs in the non-CE mode. The light SSB can include a CE request configuration. The BS may switch to transmit SSBs and SIBs in the CE mode upon a request from a UE. The UE may transmit the request based on the CE request information. The BS may stop transmitting the light SSBs while the SSBs are transmitted in the CE mode.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

Figure 2:
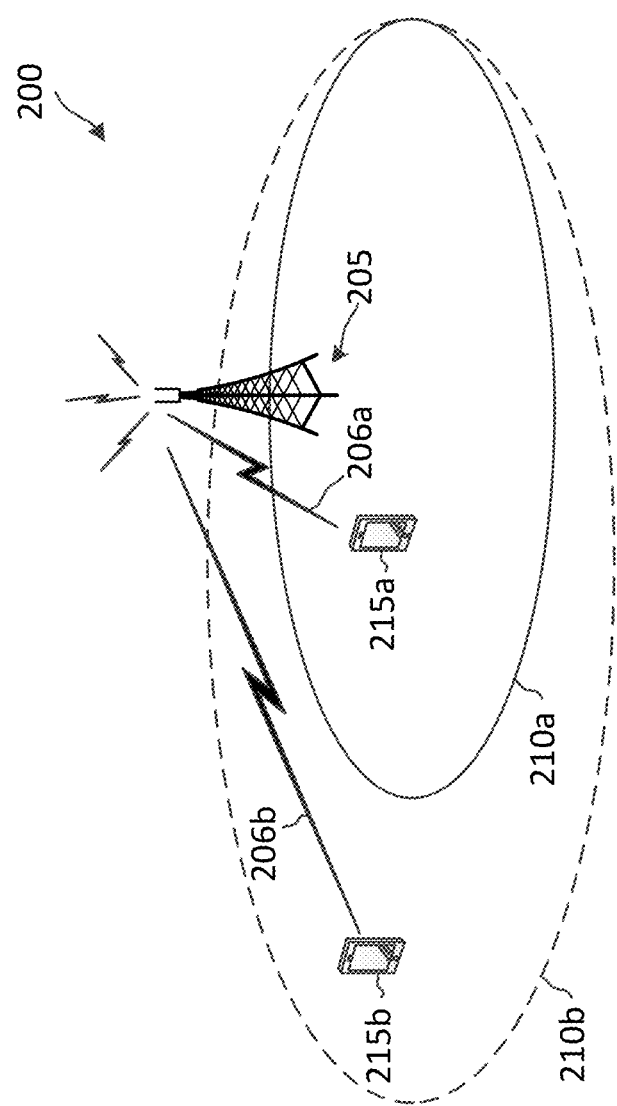
FIG. 2 illustrates coverage extension (CE) in a wireless communication network according to some embodiments of the present disclosure.

FIG. 2 illustrates CE in a wireless communication network 200 according to some embodiments of the present disclosure. The network 200 may correspond to a portion of the network 100 that implements CE. FIG. 2 illustrates one BS 205 and two UEs 215a and 215b for purposes of simplicity of discussion, though it will be recognized that embodiments of the present disclosure may scale to many more UEs 215 (e.g., about 3, 4, or more than 5) and/or BSs 205 (e.g., about 2 or 3 or more). The BS 205 is similar to the BSs 105. The UEs 215 are similar to the UEs 115. The BS 205 may provide communication in a coverage area 210a under a normal coverage mode. The BS 205 may apply CE techniques to provide communication coverage in a large coverage area 210b. In an embodiment, the BS 205 may provide on-demand coverage extended coverage, as described in greater detail herein.

Similar to the network 100, the BS 205 may transmit broadcast signals including SSBs and SIBs in the network 200 periodically to facilitate communications in the network 200. The BS 205 may transmit the broadcast signals using a first set of transmission parameters (e.g., a modulation coding scheme (MCS), a transmission power, and/or beam directions) to provide communications in the normal coverage area 210a. The UE 215a located within the normal coverage area 210a may receive and decode the broadcast signals. The UE 215a may perform a random access procedure with the BS 205, and may establish a connection with the BS 205, and communicate with the BS 205 over a radio link 206a using similar mechanisms as described above with respect to FIG. 1. The UE 215a may be referred to as a non-CE-UE.

To extend the coverage to a larger area 210b than the normal coverage area 210a, the BS 205 may transmit the broadcast signals using a second set of transmission parameters that are more robust than the first set of transmission parameters. In an embodiment, the BS 205 may extend the coverage or reach of the broadcast signals by repeating the content (e.g., the SSBs and/or SIBs) of the broadcast signals in a time domain and/or in a frequency domain. For example, a UE 215b located outside of the normal coverage area 210a may not be able to receive the broadcast signals transmitted using the first set of parameters, but may receive the coverage extended broadcast signals transmitted using the second set of parameters. After receiving the coverage extended broadcast signals, the UE 215b may perform a random access procedure with the BS 205, and may establish a connection with the BS 205, and communicate with the BS 205 over a radio link 206b in the area 210b using substantially similar mechanisms as the UE 215a. The UE 215b may be referred to as a CE-UE. In some embodiments, the BS 205 may additionally signal UE-specific parameters for communications in the CE mode, for example, in a unicast channel. In an embodiment, the BS 205 may configure a UE 215 with UE-specific CE mode communication parameters via RRC configuration. The BS 205 may configure the UE with a UE-specific search space for DL control channel information monitoring. The BS 205 may transmit a DL schedule assigned to the UE 215 in the UE-specific search space. The BS 205 may transmit an RRC message carrying the UE-specific CE mode communication parameters according to the DL schedule.

The transmissions of the coverage extended broadcast signals with the repetitions can consume more system resources compared to the broadcast transmissions in the normal coverage mode. In order to utilize system resources efficiently and/or reduce system overhead, the BS 205 may transmit at least some of the broadcast signals in the normal coverage mode and may switch to the CE mode based on requests. For example, upon detection of a request from a UE 215b requiring the CE support, the BS 205 may switch to transmit the broadcast signals in the CE mode and may allocate resources for the UE 215b to communicate with the BS 205 in the CE mode. When the UE 215b travels into the normal coverage area 210a or leaves the extended coverage area 210b, the BS 205 may not be required to provide the CE support. Thus, the BS 205 may switch back to operate in the normal coverage mode. The BS 205 may dynamically switch between the normal coverage mode and the CE mode depending on whether there is any UE 215 outside of the normal coverage area 210a requiring the CE support. Mechanisms for providing on-demand extended coverage broadcast and communications are described in greater detail herein.

Figure 3:
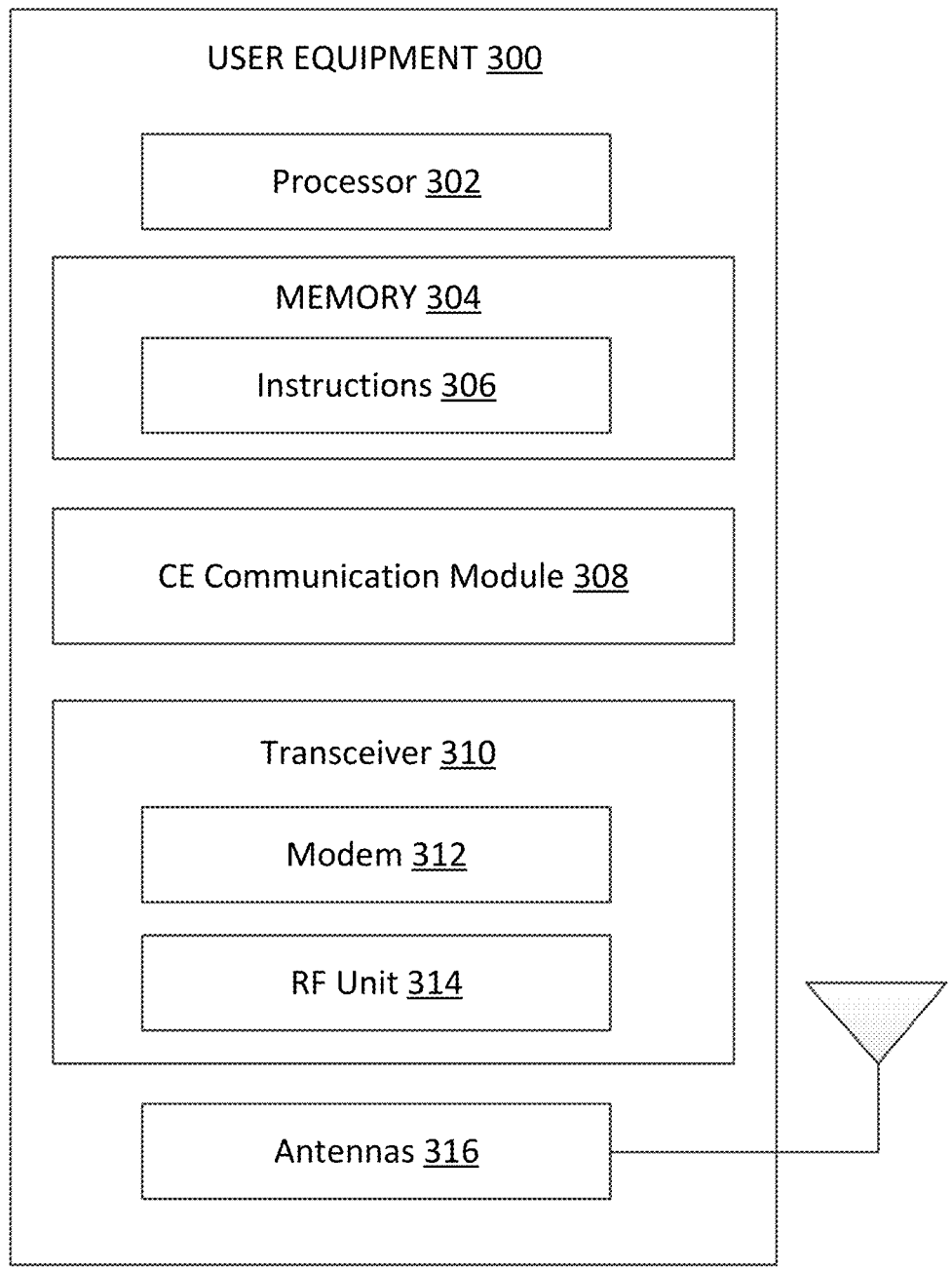
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 or 215 as discussed above in FIGS. 1 and 2, respectively. As shown, the UE 300 may include a processor 302, a memory 304, a CE communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 5-9. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CE communication module 308 may be implemented via hardware, software, or combinations thereof. For example, the CE communication module 308 may be implemented as a processor, circuit, and/or instructions 306 stored in the memory 304 and executed by the processor 302. The CE communication module 308 may be used for various aspects of the present disclosure, aspects of FIGS. 5-9. For example, the CE communication module 308 is configured to listen for broadcast signals (e.g., SSBs and SIBs) from a BS (e.g., the BSs 105 and 205), receive a CE request configuration from the BS, requests for CE mode support based on the CE request configuration, listen for coverage extended broadcast signals, perform medium sensing before transmitting a CE request, perform random access procedures in a CE mode, communicate with the BS in the CE mode, and/or notify the BS of CE support requirement changes (e.g., due to mobility). In an embodiment, the CE communication module 308 is further configured to perform the medium sensing by monitoring for a reservation signal or a preamble in the channel, refrain from transmitting the CE request upon detecting a reservation signal or a preamble, and/or transmit the CE request when the channel is idle or free. Mechanisms for performing on-demand CE broadcast information request are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the CE communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
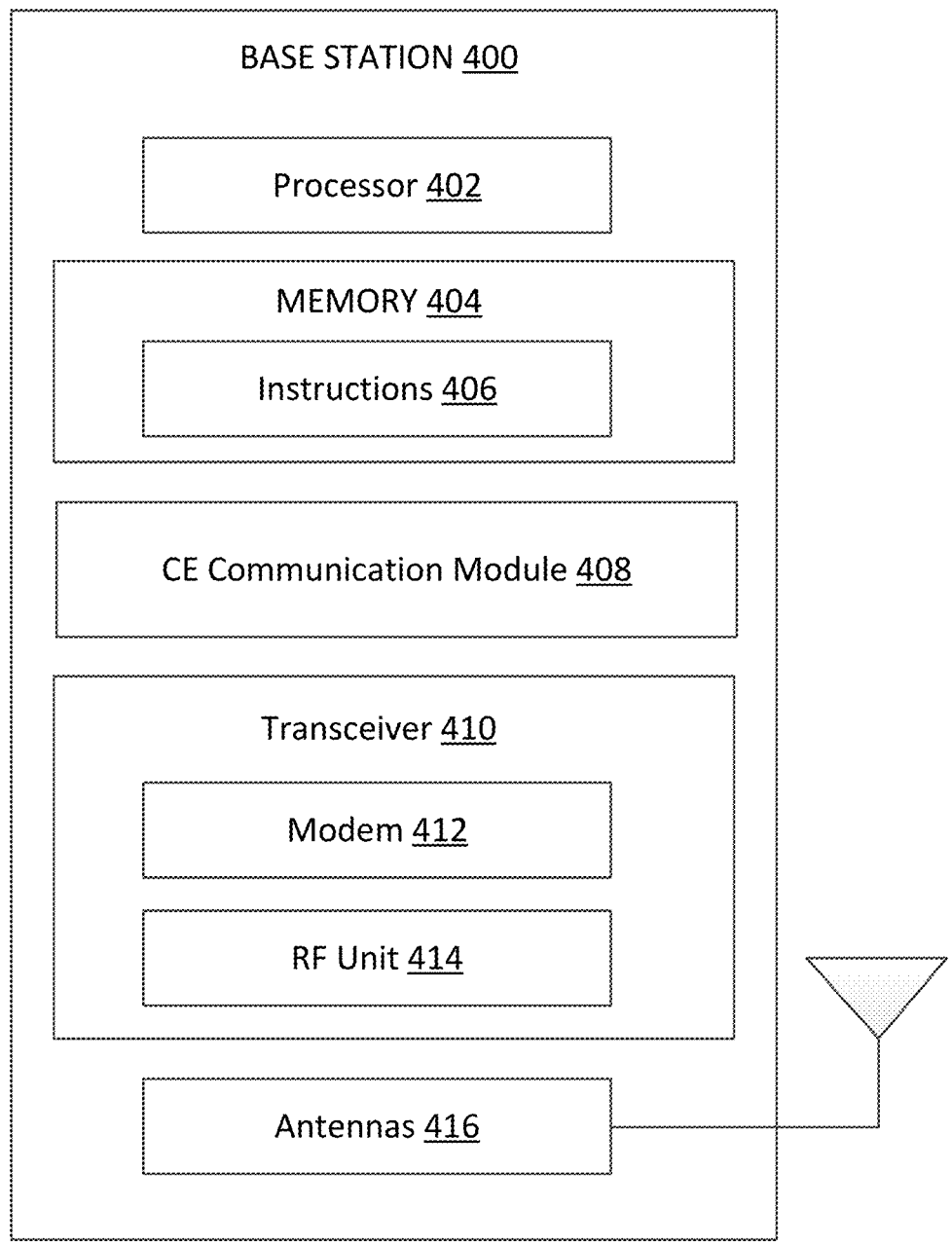
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above in FIGS. 1 and 2, respectively. A shown, the BS 400 may include a processor 402, a memory 404, a CE communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-9. Instructions 406 may also be referred to as code, which may be interpreted broadly to include any type of computer-readable statement(s) as discussed above with respect to FIG. 3.

The CE communication module 408 may be implemented via hardware, software, or combinations thereof. For example, the CE communication module 408 may be implemented as a processor, circuit, and/or instructions 406 stored in the memory 404 and executed by the processor 402. The CE communication module 408 may be used for various aspects of the present disclosure, for example, aspects of FIGS. 5-9. For example, the CE communication module 408 is configured to broadcast network signals (e.g., including SSBs and/or SIBs) in a normal coverage mode, receive CE requests from UEs (e.g., the UEs 115 and 215), broadcast the network signals in a CE mode based the received requests, allocate resources for random access in the CE mode, switch between the normal coverage mode and the CE mode for broadcast communications, and/or communicate with UEs in the normal coverage mode and/or in the CE mode, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
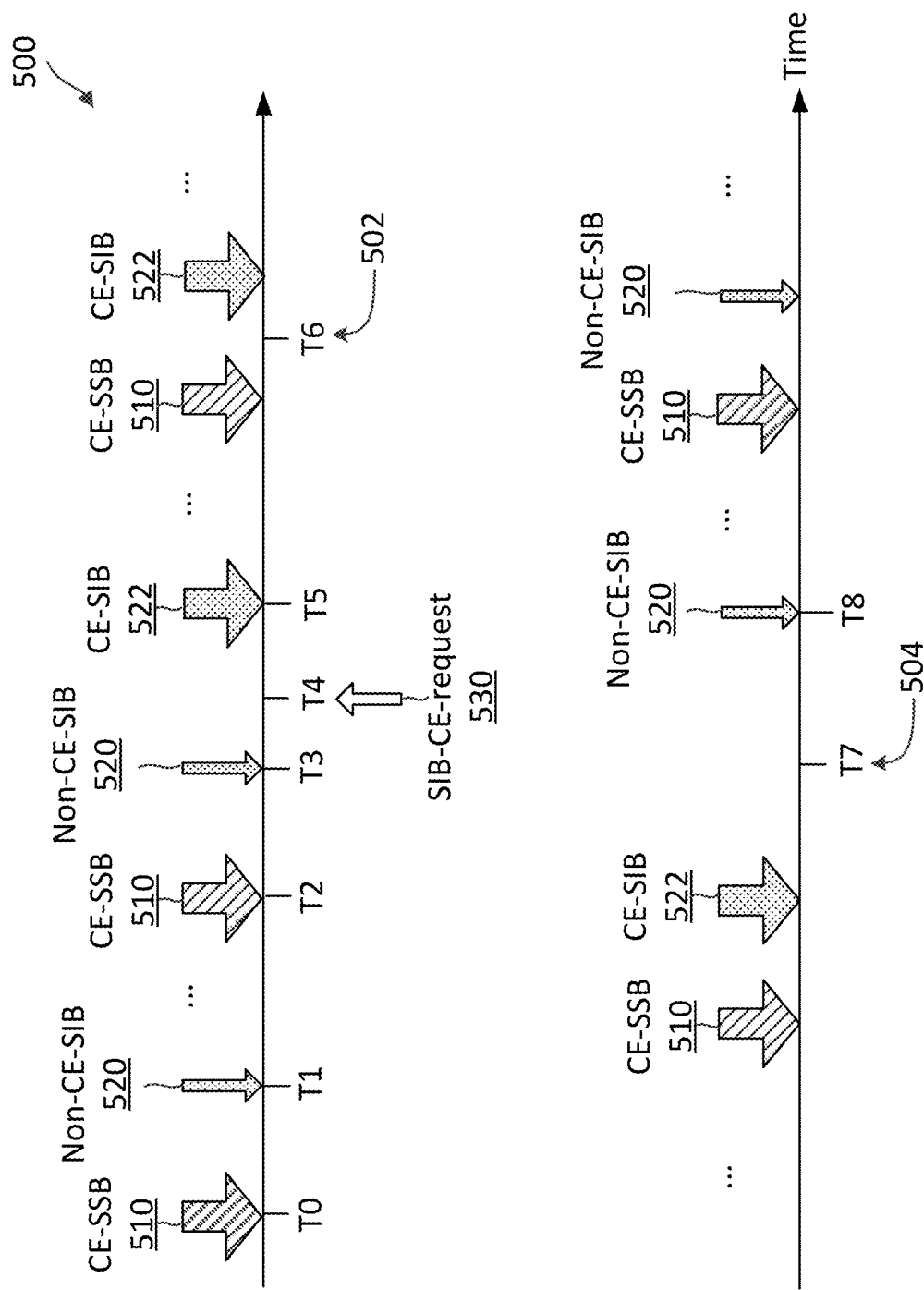
FIG. 5 illustrates an on-demand coverage extended broadcast communication scheme according to some embodiments of the present disclosure.
Figure 6:
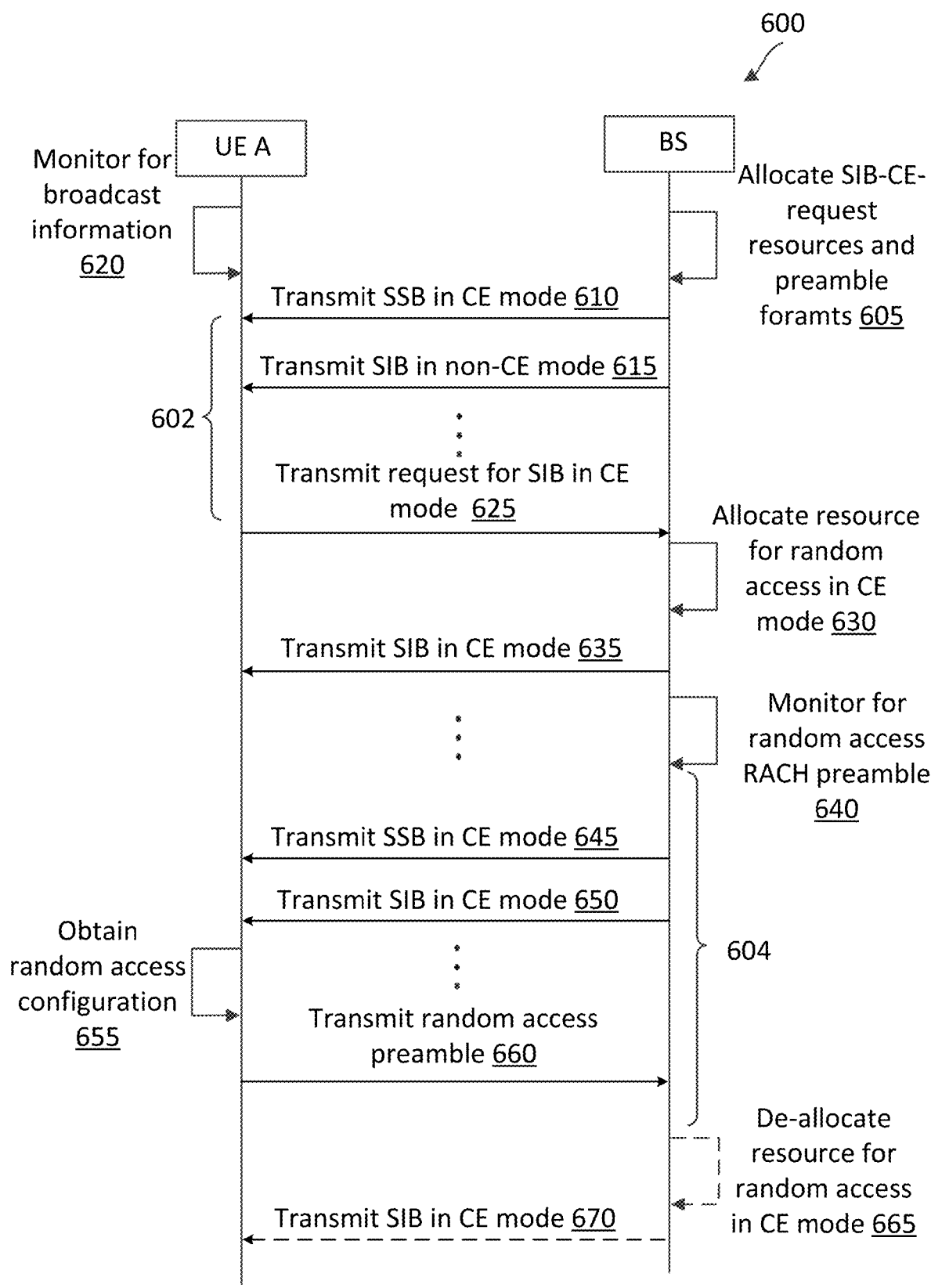
FIG. 6 is a signaling diagram of an on-demand coverage extended broadcast communication method according to some embodiments of the present disclosure.

FIGS. 5-6 illustrate mechanisms for providing on-demand SIB transmissions in a CE mode. FIG. 5 illustrates an on-demand coverage extended broadcast communication scheme 500 according to some embodiments of the present disclosure. The scheme 500 may be employed by a BS such as the BSs 105, 205, and 400 and a UE such as the UEs 115, 215, and 300 in a network such as the networks 100 and 200. In FIG. 5, the x-axes represent time in some constant units. As described above, a BS may transmit broadcast signals including SSBs and SIBs in a network to facilitate an initial network access and communications in the network. In the scheme 500, a BS may begin with transmitting SSBs 510 in a CE mode, but may transmit SIBs 520 in a normal coverage or non-CE mode (e.g., without a deep coverage). The BS may switch to transmit SIBs 522 in the CE mode based on requests. The coverage extended SSBs 510 may be referred to as CE-SSBs. The normal SIBs 520 may be referred to as non-CE-SIBs. The coverage extended SIBs 522 may be referred to as CE-SIBs.

As shown, the BS transmits the CE-SSBs 510 at time T0 and T2, for example, based on a predetermined SSB periodicity. The BS transmits the non-CE-SIB 520 at time T1 and T3, for example, based on a predetermined SIB periodicity. The SSB periodicity and/or the SIB periodicity can be at intervals of about 20 milliseconds (ms), 40 ms, 80 ms, or any suitable periodicity. The CE-SSBs 510 can include a combination of PSSs, SSSs, and MIBs. The MIB can include scheduling information (e.g., the SIB periodicity, frequency locations, and/or a time windows) for SIB acquisition. The BS may apply repetitions for the transmissions of the CE-SSBs 510. For example, a CE-SSB 510 may include multiple repetitions of a PSS, a SSS, and/or a MIB. In addition, the CE-SSBs 510 can include a CE request configuration for a UE to transmit a request for an SIB in a CE mode. For example, the CE request configuration can indicate a frequency span or range and/or a time window (e.g., time-frequency resources) allocated for extended coverage request transmissions. The non-CE-SIBs 520 may include RMSI and OSI.

A UE (e.g., the UE 215b in FIG. 2) located outside of a normal coverage area (e.g., the area 210a in FIG. 2) of the BS may receive the CE-SSBs 510, but may not be able to receive the non-CE-SSBs 520. Thus, at time T4, the UE transmits a request 530 to the BS requesting for an SIB to be transmitted in a CE mode. The request 530 can be referred to as an SIB-CE-request. In an embodiment, the CE request configuration may include a timer configuration for triggering an SIB-CE-request transmission at a UE. For example, the timer configuration may indicate an expiration period for detecting an SIB after a successful SSB detection. When a UE fails to detect any SIB within the expiration period, the UE may request for an SIB transmission in a CE mode.

At time T5, upon receiving the request 530, the BS may begin transmissions of SIBs 522 in the CE mode. The BS may transmit the CE-SIBs 522 with the same periodicity as the non-CE-SIBs 520. Alternatively, the BS may transmit the CE-SIBs 522 with a different periodicity as the non-CE-SIBs 520. The CE-SIBs 522 may carry substantially similar system information (e.g., the RMSI and the OSI) as the non-CE-SIBs 520, but the system information may be repeated in time and/or frequency.

After starting the transmissions of the CE-SIBs 522, the BS may allocate random access resources for the UE to perform initial network access in the CE mode. The random access resources for the CE mode may be referred to as CE-random access resources as shown by the arrow 502. The CE-random access resources may be configured to allow a UE to transmit a random access preamble with repetitions. The CE-SIBs 522 may indicate the allocated CE-random access resources. The BS may monitor for a random access preamble in the allocated CE-random access resources after the BS starts to transmit the CE-SIBs 522.

In an embodiment, the request 530 can indicate a desired repetition level (e.g., about 2, 4, 8, or 16) for communications in the CE mode. Different UEs located at different locations may experience different channel conditions, and thus may require different repetition levels for communicating with the BS successfully. The BS may transmit the CE-SIBs 522 with the system information repeated at the requested repetition level.

In some instances, the BS may receive SIB-CE-requests from multiple UEs with different requested repetition levels. The BS may transmit the CE-SIBs 522 using the maximum repetition level among the requested repetition levels to enable all UEs requesting the CE more support to receive the CE-SIBs 522. For example, when the BS receives an SIB-CE-request for a repetition of 4 from one UE and another SIB-CE-request for a repetition of 16 from another UE, the BS may transmit the CE-SIBs 522 with a repetition of 16. However, the BS may allocate separate CE-random access resources for random access preamble transmissions with a repetition level of 4 and for random access preamble transmissions with a repetition level of 16. The BS may indicate a set of random access resources for a repetition level of 4 in the CE-SIBS 522 and another set of random access resources for a repetition level of 16 in the CE-SIBs 522.

In an embodiment, the request 530 can be transmitted in the form of a random access preamble similar to the random access preamble used for an initial network access. The BS may allocate a set of resources and/or a set of preamble sequences for UEs to transmit an SIB-CE-request. The allocated resources may be referred to as SIB-CE-request resources. In some embodiments, the BS may assign different combinations of resources and/or preamble sequences (e.g., waveforms) to represent requests for different levels or different number of repetitions.

For example, the UE may transmit a preamble sequence with a particular sequence identifier (ID) to indicate a request for a particular repetition level (e.g., repetitions of 2, 4, 8, or 16) for communications in the CE mode. Alternatively, the UE may transmit a preamble sequence in a particular resource (e.g., time-frequency resource) to indicate a request for a particular repetition level. Yet alternatively, the UE may transmit a particular preamble sequence in a particular resource to indicate a request for a particular repetition level. Since the BS may be required to detect an SIB-CE request, but may not be required to differentiate the senders of the requests, multiple UEs may transmit SIB-CE-requests for the same repetition level in the same resource. Thus, the resources and/or preamble sequence formats for SIB-CE-request transmissions can be substantially less than the resources and/or preamble sequence formats for initial random access procedures.

At time T6, after the BS started the transmissions of the CE-SIBs 522, the BS may de-allocate the SIB-CE-request resources. The BS may de-allocate the SIB-CE-request resources based on the repetition level used for the transmissions of the CE-SIBs 522. For example, when the CE-SIBs 522 are transmitted using a repetition level of 8, the BS may de-allocate the SIB-CE-request resources allocated for transmissions of SIB-CE-requests for a repetition level lower than 8 (e.g., repetitions of 2 and/or 4). However, the BS may not de-allocate the SIB-CE-request resources allocated for transmissions of SIB-CE-requests for a repetition of 16 so that another UE may still be able to request the BS for a higher repetition level of 16.

After time T5, the BS may continue to transmit the CE-SSBs 510 and the CE-SIBs 522 according to corresponding periodicities. At time T7, the BS may determine that no random access preamble signal is detected from the allocated random access-CE resources as shown by the arrow 504. Thus, at time T8, the BS may switch to the non-CE mode to transmit the non-CE SIBs 520. In addition, the BS may optionally de-allocate the CE-random access resources to reduce system overhead. Furthermore, the BS may configure the SIB-CE-request resources again if they were de-allocated before as noted above.

In an embodiment, the BS may transmit the CE-SSBs 510, where the PBCH payload can be extended to carry the CE request configuration. In some other embodiments, the BS may transmit the CE request configuration in a different layer 1 (L1) channel, for example, a secondary PBCH. The secondary PBCH can be transmitted concurrently with the PBCH using frequency-division multiplexing (FDM). For example, an unlicensed frequency band in a frequency range around sub-6 GHz may be divided into multiple channels each with a bandwidth of about 20 MHz. The PBCH may occupy about 20 resource blocks (RBs), which may occupy a bandwidth of about 7200 kHz at a subcarrier spacing of about 30 kHz. Thus, the secondary PBCH can be frequency-multiplexed with the PBCH in a channel. Similarly, an unlicensed frequency band in a frequency range around 60 GHz may be divided in channels of about 500 MHz bandwidths, where the secondary PBCH may be frequency-multiplexed with the PBCH in a channel.

In an embodiment, the scheme 500 may be employed in a mmWave band. In such an embodiment, the UE may perform beamforming to form a transmission beam for transmitting the SIB-CE-request 530. The BS may perform beamforming to form reception beams sweeping through multiple beam directions to monitor for an SIB-CE-request from a UE. The UE may transmit the SIB-CE-request 530 at multiple time instances so that the BS may be able to detect the SIB-CE-request 530. Alternatively, the UE may transmit the SIB-CE-request 530 on the resources corresponding to the beam (e.g., the beam direction) where the UE detected the CE-SSBs 510. In both cases, the BS may transmit the CE-SIBs 522 in the requested beam direction.

While the scheme 500 is illustrated with transmissions of CE-SIBs 522 after receiving the request 530 (e.g., between time T5 and time T7), in some embodiments, the BS may transmit CE-SIBs 522 in some transmission or SIB scheduling instances and may transmit non-CE-SIBs 520 in some other transmission or SIB scheduling instances to reduce system overhead.

FIG. 6 is a signaling diagram of an on-demand coverage extended broadcast communication method according to some embodiments of the present disclosure. The method 600 is implemented by a BS (e.g., the BSs 105, 205, and 400) and a UE (e.g., the UEs 115, 215, and 300) in a network (e.g., the networks 100 and 200). The method 600 may use similar mechanisms as in the scheme 500 described above with respect to FIG. 5. Steps of the method 600 can be executed by computing devices (e.g., a processor, processing circuit, and/or other suitable component) of the BS (e.g., BS 400 in FIG. 4) and the UE (e.g., UE 300 in FIG. 3). As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 605, the BS allocates SIB-CE-request resources and preamble formats.

At step 610, the BS transmits an SSB (e.g., the CE-SSBs 510) in a CE mode. At step 615, the BS transmits an SIB (e.g., the non-CE-SIBs 520) in a non-CE mode. The BS may repeat the transmissions of the CE-SSB and the non-CE-SIB periodically based on an SSB scheduling periodicity and an SIB scheduling periodicity, respectively.

At step 620, the UE monitors for broadcast information signals. The UE may be located outside of a normal coverage area (e.g., the area 210a) of the BS. Thus, the UE may detect the CE-SSBs, but may not detect the non-CE-SIBs. The CE-SSBs may include PSSs, SSSs, MIBs, and a CE request configuration. The CE request configuration can indicate resources for an SIB-CE-request transmission and an expiration period (e.g., an expiration period 602) for SIB acquisition. The UE may synchronize to the BS based on the PSSs and SSSs. The UE may decode the MIBs to obtain SIB scheduling information. The UE may start a timer with the expiration period 602 and monitor for an SIB from the BS based on the SIB scheduling information.

At step 625, upon an expiration of the UE timer, the UE transmits a request (e.g., the request 530) for an SIB in a CE mode.

At step 630, in response to the request, the BS allocates resources for random access in the CE mode. At step 635, the BS transmits an SIB (e.g., the CE-SIBs 522) in the CE mode. The CE-SIB may include a random access configuration indicating the allocated resources and/or preamble formats for random access in the CE mode.

At step 640, the BS monitors for a random access preamble from the UE in the allocated CE-random access resources. The BS may configure a timer with an expiration period 604. The BS may repeat the transmissions of the CE-SSB and the CE-SIB according to corresponding scheduling periodicities, for example, as shown in steps 645 and 650, respectively.

At step 655, the UE may receive the CE-SIBs and obtain the random access configuration from the CE-SIBs. At step 660, the UE may transmit a random access preamble based on the random access configuration. Subsequently, the UE may establish a connection with the BS in the CE mode and communicate with the BS in the CE mode.

In some embodiments, the BS may fail to detect a random access preamble corresponding to the CE mode or the network may not have any UEs requiring the CE support as shown by the dashed lines. In such embodiments, at step 665, upon an expiration of the BS timer, the BS may determine that no random access preamble is received in the CE-random access resources within the expiration period 604 and may de-allocate the resources allocated for random access in the CE mode. At step 670, in response to the expiration of the BS timer, the BS switches to transmit the SIB in the non-CE mode. The BS may continue to transmit the SSBs in the CE mode.

Figure 7:
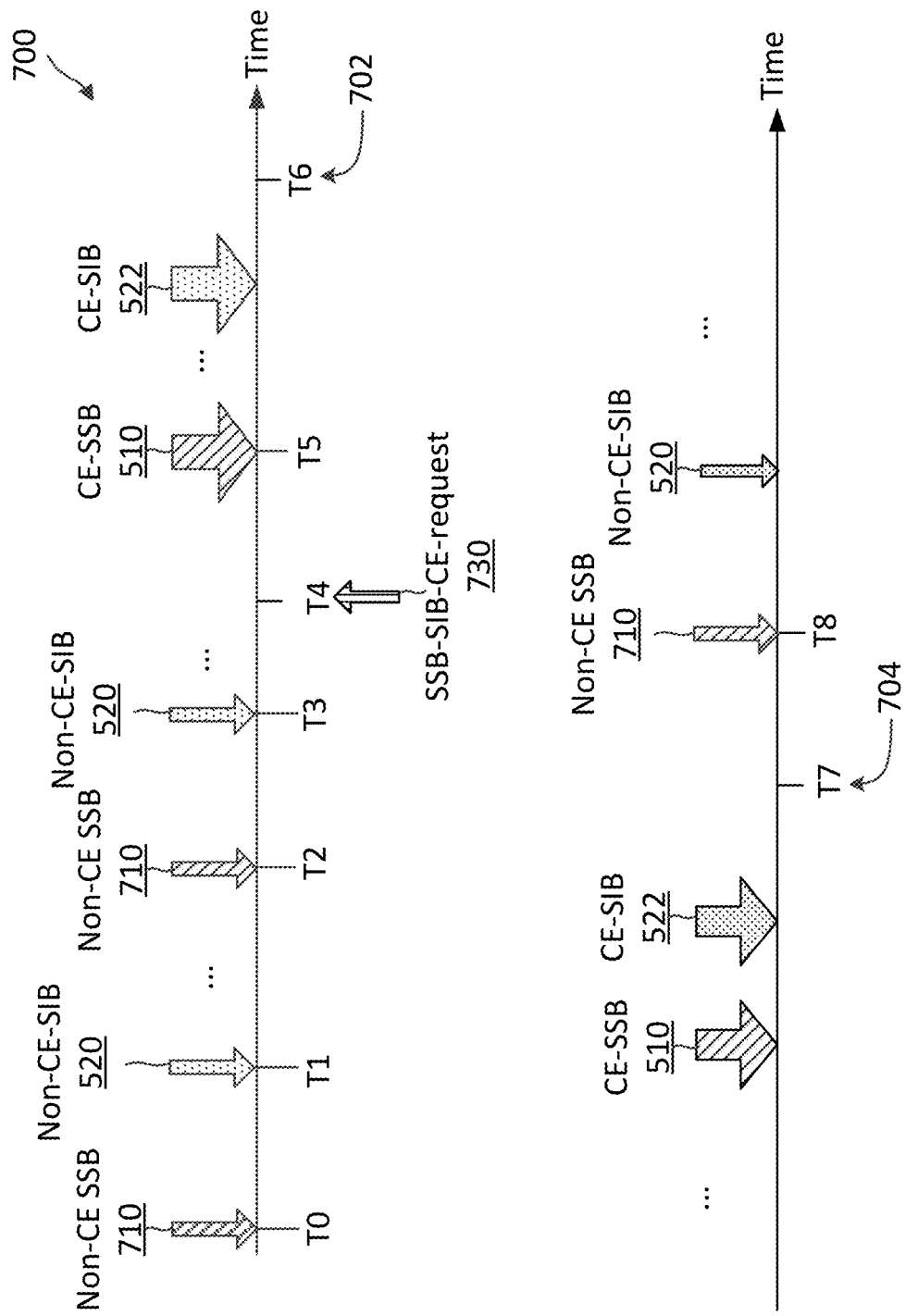
FIG. 7 illustrates an on-demand coverage extended broadcast communication scheme according to some embodiments of the present disclosure.
Figure 8:
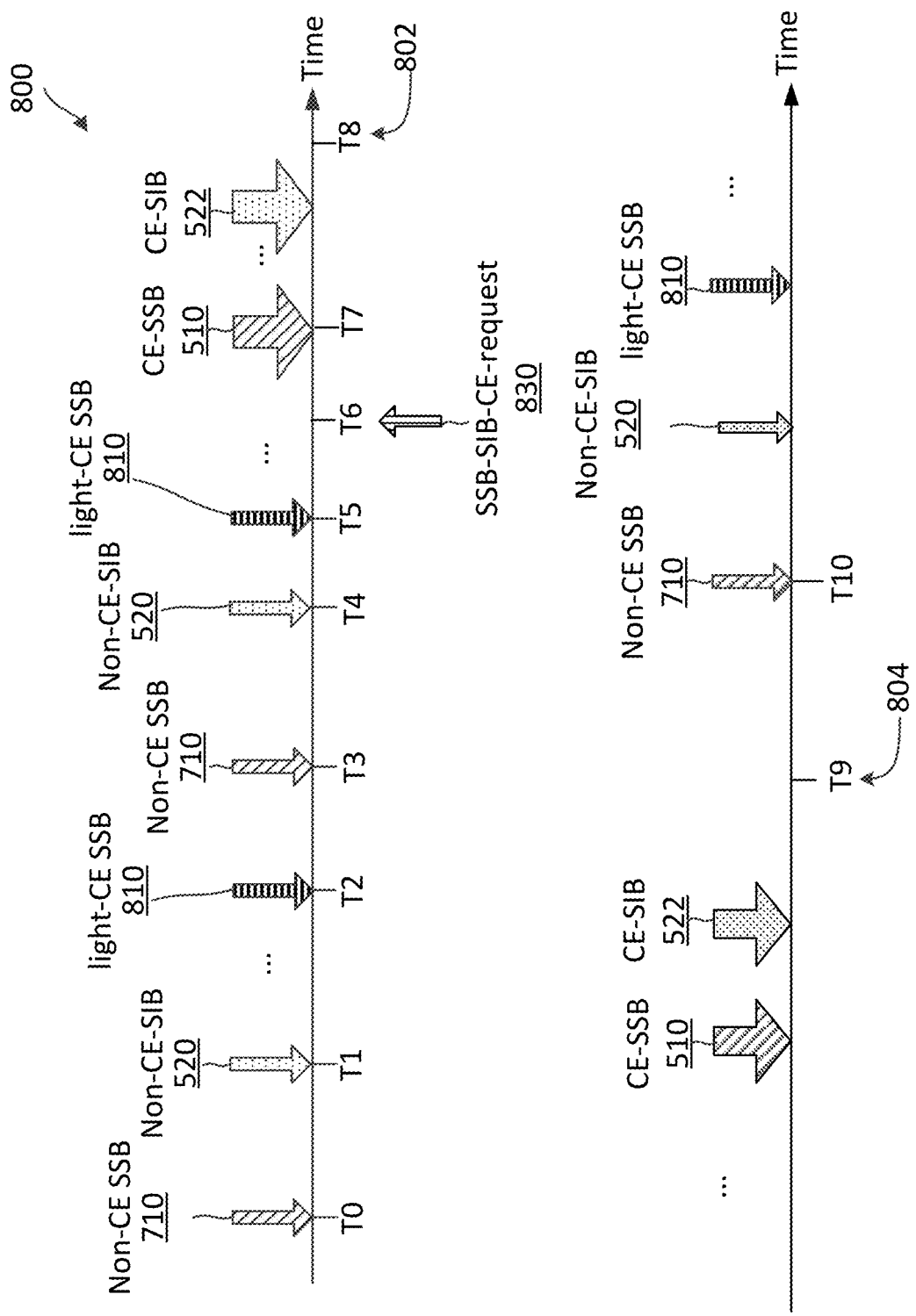
FIG. 8 illustrates an on-demand coverage extended broadcast communication scheme according to some embodiments of the present disclosure.

FIGS. 7-8 illustrate mechanisms for providing on-demand SSB and SIB transmissions in a CE mode. FIG. 7 illustrates an on-demand coverage extended broadcast communication scheme 700 according to some embodiments of the present disclosure. The scheme 700 may be employed by a BS such as the BSs 105, 205, and 400 and a UE such as the UEs 115, 215, and 300 in a network such as the networks 100 and 200. In FIG. 7, the x-axes represent time in some constant units.

The scheme 700 is substantially similar to the scheme 500 and the method 600, and may use the same reference numerals as in FIG. 5 for simplicity sake. However, in the scheme 700, a BS may begin with transmitting SSBs 710 and SIBs 520 in a normal or non-CE mode (e.g., without deep coverage) instead of beginning with transmitting SSBs in the CE mode. The normal SSBs 710 may be referred to as non-CE-SSBs. The non-CE-SSBs 710 may be substantially similar to the SSBs 510, but the BS may not apply the CE repetitions for the transmissions of the non-CE-SSBs 710.

As shown, the BS transmits the non-CE-SSBs 710 at time T0 and T2, for example, based on a predetermine SSB periodicity. The BS transmits the non-CE-SIB 520 at time T1 and T3, for example, based on a predetermined SIB periodicity. The non-CE-SSBs 710 can include a combination of PSSs, SSSs, and MIBs. The MIB can include scheduling information for SIB acquisition.

A UE (e.g., the UE 215b) located outside of a normal coverage area (e.g., the area 210a) of the BS may not receive the non-CE-SSBs 710 and the non-CE SIBs 520. Thus, at time T4, the UE transmits a request 730 to the BS requesting for an SSB and an SIB to be transmitted in a CE mode. The request 730 can be referred to as an SSB-SIB-CE-request. The request 730 may be substantially similar to the request 530 in FIG. 5. The UE may initiate the transmissions of the request 730 after monitoring a channel for a period of time without detecting any SSBs or SIBs from the BS.

In the scheme 700, since the BS begins with the transmissions of non-CE-SSBs 710 and non-CE-SIBs 520, the UE may not be able to obtain a CE request configuration from a CE-SSB 510 as in the scheme 500. To enable the BS to detect the request 730 from the UE, the UE may transmit the request 730 using a predetermined CE request configuration known to the UE and the BS. For example, the predetermined CE request configuration may indicate a predetermined waveform for transmitting an SSB-SIB-CE-request. The UE may transmit the request 730 in the form of multiple repetitions of the waveform. The predetermined CE request configuration may include one or more frequency locations for transmitting SSB-SIB-CE-requests. The predetermined CE request configuration can indicate a certain combination of channel center frequency and numerology (e.g., a subcarrier spacing). For example, the predetermined CE request configuration can indicate a first combination with a channel center frequency at about 6 GHz and a subcarrier spacing of about 30 kHz. The predetermined CE request configuration can indicate a second combination with a channel center frequency at about 60 GHz and a subcarrier spacing of about 960 kHz. The BS may monitor for an SSB-SIB-CE-request from a UE by performing detection using multiple hypotheses based on the predetermined CE request configuration. While the BS may not have timing information associated with an SSB-SIB-CE-request signal waveform transmitted by a UE, the BS may detect the SSB-SIB-CE-request signal waveform based on the waveform repetitions in the signal.

At time T5, upon receiving the request 730, the BS may begin transmissions of SSBs 510 and SIBs 522 in the CE mode. The BS may transmit the CE-SSBs 510 and the CE-SIBs 522 with the same periodicity as the non-CE-SSBs 710 periodicity and non-CE-SIBs 520 periodicity, respectively. Alternatively, the BS may transmit the CE-SSBs 510 and/or the CE-SIBs 522 at a different transmission periodicity as the non-CE-SSBs 710 periodicity and non-CE-SIBs 520 periodicity, respectively.

In an embodiment, the UE may perform medium sensing before transmitting the request 730 to avoid interfering with nearby UEs and/or other devices. For example, when the UE detects a reservation signal or a preamble in the channel, the UE may refrain from transmitting the request 730 until the channel is free.

Similar to the scheme 500, the UE may indicate a level of repetition requested for the CE mode in the request 730, for example, by using different waveforms to represent different requested repetition levels. When the channel is in a mmWave band, the UE may transmit the request 730 multiple times and the BS may sweep reception beams through multiple directions to monitor for an SSB-SIB-CE-request from a UE.

At time T6, after detecting the request 730, the BS may allocate CE-random access resources as shown by the arrow 702. At time T7, the BS may determine that no random access preamble signal is detected in the CE-random access resources for a period of time as shown by the arrow 704. Thus, at time T8, the BS may switch to transmit the non-CE-SSBs 710 and the non-CE-SIBs 520. In addition, the BS may optionally de-allocate the allocated CE-random access resources. Upon detecting a random access preamble signal from the UE in the CE-random access resources, the BS may establish a connection and communicate with the UE in the CE mode.

As can be seen in the scheme 700, by transmitting non-CE-SSBs 710 under a normal coverage mode and switching to transmitting CE-SSBs 510 upon a request, the scheme 700 may be more efficient in system resource utilization than the scheme 500 and the method 600.

FIG. 8 illustrates an on-demand coverage extended broadcast communication scheme 800 according to some embodiments of the present disclosure. The scheme 800 may be employed by a BS such as the BSs 105, 205, and 400 and a UE such as the UEs 115, 215, and 300 in a network such as the networks 100 and 200. In FIG. 8, the x-axes represent time in some constant units. The scheme 800 is substantially similar to the scheme 500, the scheme 700 and the method 600, and may use the same reference numerals as in FIGS. 5 and 7 for the sake of simplicity. For example, a BS may begin with transmitting SSBs 710 and SIBs 520 in a normal or non-CE mode (e.g., without deep coverage). However, in the scheme 800, the BS may transmit an SSB 810 including a reduced set of SSB information in a CE mode. The SSB 810 may be referred to as a light-CE-SSB.

As shown, the BS transmits the non-CE-SSBs 710 at time T0 and T3, for example, based on a predetermine SSB periodicity. The BS transmits the non-CE-SIBs 520 at time T1 and T4, for example, based on a predetermined SIB periodicity. The BS transmits the light-CE-SSBs 810 at time T3 and T5, for example, based on a predetermined light-SSB periodicity. The light-SSB transmission periodicity may be shorter than the SSB transmission periodicity. The light-CE-SSBs 810 may include some synchronization signals (e.g., the PSSs and/or the SSSs) and a reduced set of information associated with a zone including multiple cells, whereas the non-CE SSBs 710 can include a larger detailed set of information associated with about 1000 or more cells. For example, the non-CE SSBs 710 may include PSSs, SSSs, and a PBCH payload configured to deliver information for about 1000 or more cell identifiers (IDs), where each cell ID may correspond to a single cell. The light-SSBs 810 may include PSSs and/or SSSs and a PBCH payload configured to deliver information for a few zone IDs, where each zone ID may correspond to a zone including multiple cells. The BS may apply signal repetitions to the transmissions of the light-CE-SSB 810. The light-CE-SSB 810 may include a CE request configuration (e.g., indicating a frequency range and/or a time window) to facilitate the transmissions of an SSB-SIB-CE request the light-CE-SSB 810. The CE request configuration in the light-CE-SSB 810 can be substantially similar to the CE request configuration in the CE-SSBs 510.

A UE (e.g., the UE 215*b*) located outside of a normal coverage area (e.g., the area 210*a*) of the BS may receive the light-CE-SSB 810 transmitted in the CE mode, but may not receive the non-CE-SSBs 710 and the non-CE SIBs 520. Thus, at time T6, the UE transmits a request 830 to the BS requesting for an SSB and an SIB to be transmitted in a CE mode. The request 830 may be substantially similar to the requests 530 and 730. The UE may transmit the request 830 based on the CE request configuration received from the light-CE-SSB 810.

At time T7, upon receiving the request 830, the BS may begin transmissions of SSBs 510 and SIBs 522 in the CE mode. The BS may transmit the CE-SSBs 510 and the CE-SIBs 522 with the same periodicity as the non-CE-SSBs 710 periodicity and non-CE-SIBs 520 periodicity, respectively. Alternatively, the BS may transmit the CE-SSBs 510 and/or the CE-SIBs 522 at a different transmission periodicity as the non-CE-SSBs 710 periodicity and non-CE-SIBs 520 periodicity, respectively. After the BS begins transmissions of the CE-SSBs 510 and the CE-SIBs 522, the BS may stop transmitting the light-CE-SSB 810 to reduce system overhead.

Similar to the scheme 500 and/or 700, at time T8, after detecting the request 830, the BS may allocate CE-random access resources as shown by the arrow 802. At time T9, the BS may determine that no random access preamble signal is detected in the CE-random access resources for a period of time. Thus, at time T10, the BS may switch to transmit the non-CE-SSBs 710 and the non-CE-SIBs 520, resume the transmissions of the light-CE-SSBs 810, and may optionally de-allocate the allocated CE-random access resources as shown by the arrow 804. Upon detecting a random access preamble signal from the UE in the CE-random access resources, the BS may establish a connection and communicate with the UE in the CE mode.

The scheme 800 may maintain a relatively low system overhead by transmitting the SSBs 810 with a reduced-information set in the CE mode while providing the UE located outside of the normal coverage area of the BS to receive synchronization and CE request configuration information for the transmissions of the SSB-SIB-CE request 830.

In some embodiments, due to mobility, a CE-UE (e.g., the UEs 115, 215 and 300) may travel from an extended coverage area (e.g., the coverage area 210*b*) of a BS (e.g., the BSs 105, 205, and 400) to within a normal coverage area (e.g., the coverage area 210*a*) of the BS and become a non-CE-UE. Conversely, a non-CE-UE may travel from within the normal coverage area to outside of the coverage area and become a CE-UE. To support mobility, the BS may allocate dedicated resources for a UE to indicate a change in CE support requirement. The dedicate resource can be a dedicated non-contention physical random access channel (PRACH) resource, a PUCCH resource, a scheduling request (SR) resource, and/or other type of uplink resource. For example, a UE may perform radio resource management (RRM) measurements, which may include reference signal received power (RSRP), reference signal received quality (RSRQ), received signal strength indicator (RSSI), and/or channel state information (CSI). The measurements may be based on reception of SSBs (e.g., the SSBs 510, 710, and 810), SIBs, (e.g., the SIBs 520 and 522), and/or any reference signals such as CSI-RSs. The UE may determine whether CE support is needed for communications with BS. Upon detecting a change in CE support requirements (e.g., signal repetition level), the UE may transmit a CE change request to the BS using the dedicated resources. The BS may transmit a response message in a DL control channel using the requested signal repetition level. The DL control channel may be referred to as a physical downlink control channel (PDCCH) and the response message may be in the form of a downlink control information (DCI) format. When a BS misses a request from a UE transitioning from a CE-UE to a non-CE-UE, the UE may continue to communicate with the BS in the CE mode. When a BS misses a request from a UE transitioning from a non-CE-UE to a CE-UE, the UE may fail to communicate with the BS and may transmit a request (e.g., the requests 530, 730, and 830) for communications in the CE mode.

In some embodiments, a BS (e.g., the BSs 105, 205, and 400) may transmit a CE request configuration of the BS and one or more CE request configurations of one or more neighboring cells. Thus, a UE that has previously connected to the BS or served by the BS may have received the CE request configurations of the neighboring cells. When the UE is out of a normal coverage area (e.g., the area 210*a*) of the BS, the UE may request for CE support using the CE configurations of the serving cell and/or neighboring cells.

Figure 9:
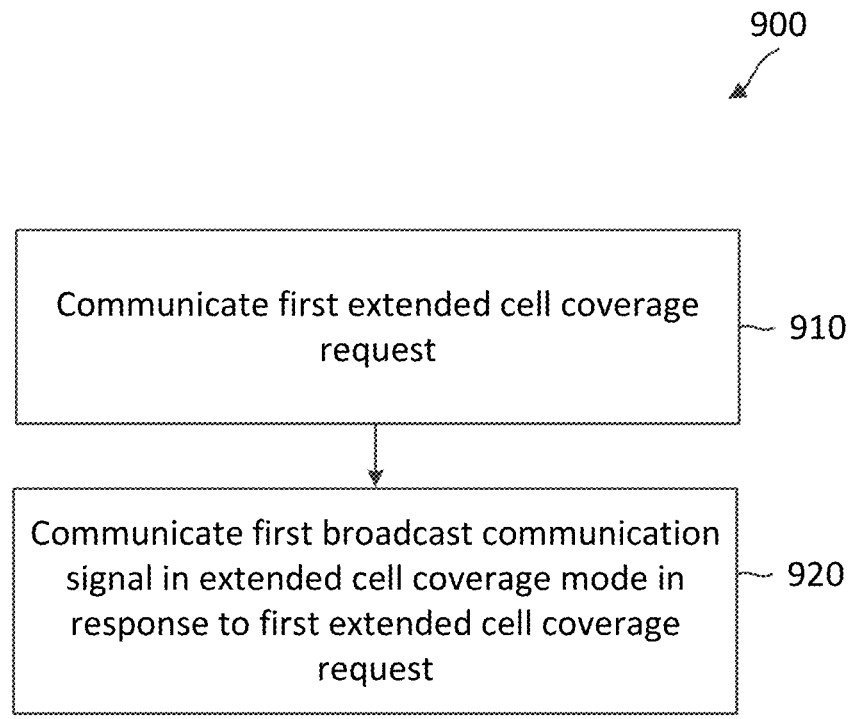
FIG. 9 is a flow diagram of a communication method according to embodiments of the present disclosure.

FIG. 9 is a flow diagram of a communication method 900 according to embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, UE 215, or UE 300, may utilize one or more components, such as the processor 302, the memory 304, the CE communication module 308, the transceiver 310, and the one or more antennas 316, to execute the steps of method 900. In another example, a wireless communication device, such as the BS 105, 205, and 400, may utilize one or more components, such as the processor 402, the memory 404, the CE communication module 408, the transceiver 410, and the one or more antennas 416, to execute the steps of method 900. The method 900 may employ similar mechanisms as in the schemes 500, 700, and 800 and the method 600 described above with respect to FIGS. 5, 7, 8, and 6, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device, a first extended cell coverage request (e.g., the requests 530, 730, and 830).

At step 920, the method 900 includes communicating, by the first wireless communication device with the second wireless communication device, a first broadcast communication signal (e.g., the CE-SSBs 510, the CE-SIBs 522, and the light-CE-SSBs 810) in an extended cell coverage mode in response to the first extended cell coverage request.

In an embodiment, the first wireless communication device may correspond to a BS and the second wireless communication device may correspond to a UE. In such an embodiment, the first wireless communication device may receive the first extended cell coverage request from the second wireless communication device and may transmit the first broadcast communication signal to the second wireless communication device.

In another embodiment, the first wireless communication device may correspond to a UE and the second wireless communication device may correspond to a BS. In such an embodiment, the first wireless communication device may transmit the first extended cell coverage request to the second wireless communication device and may receive the first broadcast communication signal from the second wireless communication device.

In some embodiments, the first broadcast communication signal including a system information block (e.g., including a PSS, a SSS, a MIB, and/or a CE request configuration) repeated in at least one of a time domain or a frequency domain.

In some embodiments, the first extended cell coverage request may indicate a requested number of repetitions, and the first broadcast communication signal may include the system information block repeated by at least the requested number of repetitions in the time domain. In some embodiments, the first wireless communication device may communicate the request by communicating a random access preamble sequence corresponding to the requested number of repetitions with the second wireless communication device.

In some embodiments, the first wireless communication device may communicate the first extended cell coverage request by communicating a signal including a random access preamble sequence and at least one additional repetition of the random access preamble sequence.

In some embodiments, the first extended cell coverage request may correspond to the SIB-CE-request 530 and the first broadcast communication signal may include a CE-SIB 522 as shown in the scheme 500. In such embodiments, the first wireless communication device may communicate, with the second wireless communication device, a second broadcast communication signal (e.g., the CE-SSBs 510) in the extended cell coverage mode, where second broadcast communication signal including at least a resource for communicating the first extended cell coverage request.

In some embodiments, the first extended cell coverage request may correspond to the SSB-SIB-CE-request 730 and the first broadcast communication signal may include a CE-SSB 510 and/or a CE-SIB 522 as shown in the scheme 700. In such embodiments, the first wireless communication device can communicate the first extended cell coverage request by communicating, with the second wireless communication device, a signal including a predetermined waveform based on at least one of a predetermined center frequency or a predetermined subcarrier spacing. When the first wireless communication device corresponds to a UE, the first wireless communication device can perform medium sensing in a channel. When the channel is free, the first wireless communication device may transmit the first extended cell coverage request.

In some embodiments, the first extended cell coverage request may correspond to the SSB-SIB-CE-request 830 and the first broadcast communication signal may include a CE-SSB 510 and/or a CE-SIB 522. In such embodiments, the first wireless communication device may communicate, with the second wireless communication device, a second broadcast communication signal (e.g., the light-CE-SSBs 810) in the extended cell coverage mode as shown in the scheme 800, where second broadcast communication signal including at least a resource for communicating the first extended cell coverage request. In addition, the first wireless communication device may communicate, with the second wireless communication device, a third broadcast communication signal (e.g., the non-CE-SSBs 710) in a non-extended cell coverage mode (e.g., the normal more without deep coverage or penetration). The third broadcast communication signal can include information associated with a plurality of cells. The second broadcast communication signal can include information associated with at least one of the plurality of cells. The second broadcast communication signal can be scheduled with a shorter periodicity than the third broadcast communication signal.

In some embodiments, when the first wireless communication device corresponds to a UE, the first wireless communication device may transmit the first extended cell coverage request based on an expiration period (e.g., the period 602) for detecting a broadcast communication (e.g., an SSB or an SIB).

In some embodiments, the first wireless communication device may communicate the first extended cell coverage request by communicating, by the first wireless communication device with the second wireless communication device, a first random access preamble signal in a first beam direction and a second random access preamble signal in a second beam direction, where the first beam direction is different from the second beam direction.

In some embodiments, when the first wireless communication device corresponds to a BS, the first wireless communication device can allocate a resource for random access in the extended cell coverage mode based on the first extended cell coverage request. The first wireless communication device can monitor for a random access preamble signal in the resource for random access in the extended cell coverage mode. The first wireless communication device can de-allocate the resource for random access in the extended cell coverage mode based on an expiration period (e.g., the period 604) for detecting a random access preamble signal in the resource for random access in the extended cell coverage mode.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a computer-readable medium having program code recorded thereon, the program code comprising code for causing a first wireless communication device to communicate, with a second wireless communication device, a first extended cell coverage request; and code for causing the first wireless communication device to communicate, with the second wireless communication device, a first broadcast communication signal in an extended cell coverage mode in response to the first extended cell coverage request.

In some embodiments, wherein the code for causing the first wireless communication device to communicate the first broadcast communication signal in the extended cell coverage mode is further configured to communicate, with the second wireless communication device, the first broadcast communication signal including a system information block repeated in at least one of a time domain or a frequency domain. In some embodiments, wherein the first extended cell coverage request indicates a requested number of repetitions, and wherein the first broadcast communication signal includes the system information block repeated by at least the requested number of repetitions in the time domain. In some embodiments, wherein the code for causing the first wireless communication device to communicate the first extended cell coverage request is further configured to communicate, with the second wireless communication device, a random access preamble sequence corresponding to the requested number of repetitions. In some embodiments, the computer-readable medium further comprises code for causing the first wireless communication device to communicate, with the second wireless communication device, a second broadcast communication signal in the extended cell coverage mode, the second broadcast communication signal including at least a resource for communicating the first extended cell coverage request. In some embodiments, the computer-readable medium further comprises code for causing the first wireless communication device to communicate, with the second wireless communication device, a third broadcast communication signal in a non-extended cell coverage mode, wherein the third broadcast communication signal includes information associated with a plurality of identifiers (IDs), each corresponding to one cell, and wherein the second broadcast communication signal includes information associated with a plurality of IDs, each corresponding to multiple cells. In some embodiments, wherein the second broadcast communication signal is scheduled with a longer periodicity than the third broadcast communication signal. In some embodiments, wherein the code for causing the first wireless communication device to communicate the first extended cell coverage request is further configured to communicate, with the second wireless communication device, a signal including a predetermined waveform based on at least one of a predetermined center frequency or a predetermined subcarrier spacing. In some embodiments, the computer-readable medium further comprises code for causing the first wireless communication device to perform a medium sensing, wherein the code for causing the first wireless communication device to communicate the first extended cell coverage request is further configured to transmit, to the second wireless communication device, the first extended cell coverage request based on the medium sensing. In some embodiments, wherein the code for causing the first wireless communication device to communicate the first extended cell coverage request is further configured to transmit, to the second wireless communication device, the first extended cell coverage request based on an expiration period for detecting a broadcast communication. In some embodiments, wherein the code for causing the first wireless communication device to communicate the first extended cell coverage request is further configured to communicate, with the second wireless communication device, a signal including a random access preamble sequence and at least one additional repetition of the random access preamble sequence. In some embodiments, wherein the code for causing the first wireless communication device to communicate the first extended cell coverage request is further configured to communicate, with the second wireless communication device, a first random access preamble signal in a first beam direction. In some embodiments, wherein the code for causing the first wireless communication device to communicate the first extended cell coverage request is further configured to communicate, with the second wireless communication device, a second random access preamble signal in a second beam direction, wherein the first beam direction is different from the second beam direction. In some embodiments, the computer-readable medium further comprises code for causing the first wireless communication device to allocate a resource for random access in the extended cell coverage mode based on the first extended cell coverage request; and code for causing the first wireless communication device to monitor for a random access preamble signal in the resource for random access in the extended cell coverage mode. In some embodiments, the computer-readable medium further comprises code for causing the first wireless communication device to de-allocate the resource for random access in the extended cell coverage mode based on an expiration period for detecting a random access preamble signal in the resource for random access in the extended cell coverage mode. In some embodiments, wherein the code for causing the first wireless communication device to communicate the first broadcast communication signal is further configured to transmit, to the second wireless communication device, the first broadcast communication signal including an information block in the extended cell coverage mode, and wherein the computer-readable medium further comprises code for causing the first wireless communication device to switch from the extended cell coverage mode to a non-extended cell coverage mode based on an expiration period for detecting a random access preamble signal in the resource for random access in the extended cell coverage mode; and code for causing the first wireless communication device to transmit a second broadcast communication signal in the non-extended cell coverage mode. In some embodiments, the computer-readable medium of claim 37, further comprising code for causing the first wireless communication device to communicate, with a third wireless communication device, a communication signal in a non-extended cell coverage mode; code for causing the first wireless communication device to communicate, with the third wireless communication device, a second extended cell coverage request; and code for causing the first wireless communication device to communicate, with the third wireless communication device, a downlink control channel signal in the extended cell coverage mode in response to the second extended cell coverage request. In some embodiments, the computer-readable medium further comprises code for causing the first wireless communication device to communicate, with the third wireless communication device, an extended cell coverage request configuration, wherein the second extended cell coverage request is communicated based on the extended cell coverage request configuration.

Further embodiments of the present disclosure include an apparatus comprising means for communicating, with a wireless communication device, a first extended cell coverage request; and means for communicating, with the wireless communication device, a first broadcast communication signal in an extended cell coverage mode in response to the first extended cell coverage request.

In some embodiments, wherein the means for communicating the first broadcast communication signal in the extended cell coverage mode is further configured to communicate, with the wireless communication device, the first broadcast communication signal including a system information block repeated in at least one of a time domain or a frequency domain. In some embodiments, wherein the first extended cell coverage request indicates a requested number of repetitions, and wherein the first broadcast communication signal includes the system information block repeated by at least the requested number of repetitions in the time domain. In some embodiments, wherein the means for communicating the first extended cell coverage request is further configured to communicate, with the wireless communication device, a random access preamble sequence corresponding to the requested number of repetitions. In some embodiments, the apparatus further comprises means for communicating, with the wireless communication device, a second broadcast communication signal in the extended cell coverage mode, the second broadcast communication signal including at least a resource for communicating the first extended cell coverage request. In some embodiments, the apparatus further comprises means for communicating, with the wireless communication device, a third broadcast communication signal in a non-extended cell coverage mode, wherein the third broadcast communication signal includes information associated with a plurality of identifiers (IDs), each corresponding to one cell, and wherein the second broadcast communication signal includes information associated with a plurality of IDs, each corresponding to multiple cells. In some embodiments, wherein the second broadcast communication signal is scheduled with a longer periodicity than the third broadcast communication signal. In some embodiments, wherein the means for communicating the first extended cell coverage request is further configured to communicate, with the wireless communication device, a signal including a predetermined waveform based on at least one of a predetermined center frequency or a predetermined subcarrier spacing. In some embodiments, the apparatus further comprises means for performing a medium sensing, wherein the means for communicating the first extended cell coverage request is further configured to transmit, to the wireless communication device, the first extended cell coverage request based on the medium sensing. In some embodiments, wherein the means for communicating the first extended cell coverage request is further configured to transmit, to the wireless communication device, the first extended cell coverage request based on an expiration period for detecting a broadcast communication. In some embodiments, wherein the means for communicating the first extended cell coverage request is further configured to communicate, with the wireless communication device, a signal including a random access preamble sequence and at least one additional repetition of the random access preamble sequence. In some embodiments, wherein the means for communicating the first extended cell coverage request is further configured to communicate, with the wireless communication device, a first random access preamble signal in a first beam direction. In some embodiments, wherein the means for communicating the first extended cell coverage request is further configured to communicate, with the wireless communication device, a second random access preamble signal in a second beam direction, wherein the first beam direction is different from the second beam direction. In some embodiments, the apparatus further comprises means for allocating a resource for random access in the extended cell coverage mode based on the first extended cell coverage request; and means for monitoring for a random access preamble signal in the resource for random access in the extended cell coverage mode. In some embodiments, the apparatus further comprises means for de-allocating the resource for random access in the extended cell coverage mode based on an expiration period for detecting a random access preamble signal in the resource for random access in the extended cell coverage mode. In some embodiments, wherein the means for communicating the first broadcast communication signal is further configured to transmitting, to the wireless communication device, the first broadcast communication signal including an information block in the extended cell coverage mode, and wherein the apparatus further comprises means for switching from the extended cell coverage mode to a non-extended cell coverage mode based on an expiration period for detecting a random access preamble signal in the resource for random access in the extended cell coverage mode; and means for transmitting a second broadcast communication signal in the non-extended cell coverage mode. In some embodiments, the apparatus further comprises means for communicating, with a third wireless communication device, a communication signal in a non-extended cell coverage mode; means for communicating, with the third wireless communication device, a second extended cell coverage request; and means for communicating, with the third wireless communication device, a downlink control channel signal in the extended cell coverage mode in response to the second extended cell coverage request. In some embodiments, the apparatus further comprises means for communicating, with the third wireless communication device, an extended cell coverage request configuration, wherein the second extended cell coverage request is communicated based on the extended cell coverage request configuration.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a user equipment (UE), a first extended cell coverage request indicating a requested number of repetitions of a broadcast system information block; and
receiving, by the UE from a base station (BS) in response to the first extended cell coverage request, a first broadcast communication signal in an extended cell coverage mode, wherein the receiving the first broadcast communication signal in the extended cell coverage mode includes:
receiving, by the UE from the BS in response to the first extended cell coverage request, at least the requested number of repetitions of the broadcast system information block indicating one or more random access resources for a random access procedure in the extended cell coverage mode.

2. The method of claim 1, wherein the receiving the one or more repetitions of the broadcast system information block includes:
receiving, by the UE, the one or more repetitions of the broadcast system information block in at least one of a time domain or a frequency domain.

3. The method of claim 2, wherein the first broadcast communication signal includes the broadcast system information block repeated by at least the requested number of repetitions in the time domain.

4. The method of claim 3, wherein the transmitting the first extended cell coverage request includes:
transmitting, by the UE, a random access preamble sequence corresponding to the requested number of repetitions.

5. The method of claim 1, further comprising:
receiving, by the UE from the BS, a second broadcast communication signal in the extended cell coverage mode, the second broadcast communication signal including at least a resource for communicating the first extended cell coverage request.

6. The method of claim 5, further comprising:
receiving, by the UE from the BS, a third broadcast communication signal in a non-extended cell coverage mode,
wherein the third broadcast communication signal includes information associated with a plurality of identifiers (IDs), each corresponding to one cell,
wherein the second broadcast communication signal includes information associated with a plurality of IDs, each corresponding to multiple cells, and
wherein the second broadcast communication signal is scheduled with a different periodicity than the third broadcast communication signal.

7. The method of claim 1, wherein the transmitting the first extended cell coverage request includes:
transmitting, by the UE, a signal including a predetermined waveform based on at least one of a predetermined center frequency or a predetermined subcarrier spacing.

8. The method of claim 1, wherein the transmitting the first extended cell coverage request includes:
transmitting, by the UE, a signal including a random access preamble sequence and at least one additional repetition of the random access preamble sequence.

9. The method of claim 1, wherein the transmitting the first extended cell coverage request includes:
transmitting, by the UE, a first random access preamble signal in a first beam direction.

10. The method of claim 9, wherein the transmitting the first extended cell coverage request includes:
transmitting, by the UE, a second random access preamble signal in a second beam direction, and
wherein the first beam direction is different from the second beam direction.

11. An apparatus comprising:
a transceiver configured to:
transmit a first extended cell coverage request indicating a requested number of repetitions of a broadcast system information block; and
receive, from a base station (BS) in response to the first extended cell coverage request, a first broadcast communication signal in an extended cell coverage mode,
wherein the transceiver configured to receive the first broadcast communication signal in the extended cell coverage mode is configured to:
receive, in response to the first extended cell coverage request, at least the requested number of repetitions of the broadcast system information block indicating one or more random access resources for a random access procedure in the extended cell coverage mode.

12. The apparatus of claim 11, wherein the transceiver configured to receive the one or more repetitions of the broadcast system information block is further configured to:
receive the one or more repetitions of the broadcast system information block in at least one of a time domain or a frequency domain.

13. The apparatus of claim 12, wherein the first broadcast communication signal includes the broadcast system information block repeated by at least the requested number of repetitions in the time domain.

14. The apparatus of claim 13, wherein the transceiver configured to transmit the first extended cell coverage request is further configured to:
transmit, to the BS, a random access preamble sequence corresponding to the requested number of repetitions.

15. The apparatus of claim 11, wherein the transceiver is further configured to:
receive, from the BS, a second broadcast communication signal in the extended cell coverage mode, the second broadcast communication signal including at least a resource for communicating the first extended cell coverage request.

16. The apparatus of claim 15, wherein the transceiver is further configured to:
receive, from the BS, a third broadcast communication signal in a non-extended cell coverage mode,
wherein the third broadcast communication signal includes information associated with a plurality of identifiers (IDs), each corresponding to one cell,
wherein the second broadcast communication signal includes information associated with a plurality of IDs, each corresponding to multiple cells, and
wherein the second broadcast communication signal is scheduled with a different periodicity than the third broadcast communication signal.

17. The apparatus of claim 11, wherein the transceiver configured to transmit the first extended cell coverage request is further configured to:
transmit, to the BS, a signal including a predetermined waveform based on at least one of a predetermined center frequency or a predetermined subcarrier spacing.

18. The apparatus of claim 11, wherein the transceiver configured to transmit the first extended cell coverage request is further configured to:

transmit, to the BS, a signal including a random access preamble sequence and at least one additional repetition of the random access preamble sequence.

19. The apparatus of claim 11, wherein the transceiver configured to transmit the first extended cell coverage request is further configured to:

transmit, to the BS, a first random access preamble signal in a first beam direction.

20. The apparatus of claim 19, wherein the transceiver configured to transmit the first extended cell coverage request is further configured to:

transmit, to the BS, a second random access preamble signal in a second beam direction, and wherein the first beam direction is different from the second beam direction.

* * * * *